United States Patent [19]
Schultz et al.

[11] Patent Number: 5,493,626
[45] Date of Patent: Feb. 20, 1996

[54] REDUCED DIAMETER DOWN-HOLE INSTRUMENT ELECTRICAL/OPTICAL FIBER CABLE

[75] Inventors: Philip K. Schultz, Moor Park; Gregory D. Linville, Oxnard, both of Calif.

[73] Assignee: Westech Geophysical, Inc., Ventura, Calif.

[21] Appl. No.: 368,389

[22] Filed: Dec. 30, 1994

Related U.S. Application Data

[63] Continuation of Ser. No. 239,948, May 9, 1994, abandoned, which is a continuation of Ser. No. 66,392, May 21, 1993, abandoned.

[51] Int. Cl.⁶ .............................. G02B 6/44; G01V 3/00; E21B 47/00; H01B 7/00
[52] U.S. Cl. .................... 385/101; 385/12; 385/102; 385/107; 340/854.7; 73/151; 174/110 R; 174/120 R; 174/98
[58] Field of Search ................. 174/98, 100, 102 R, 174/105 R, 110 R, 120 R; 385/101, 102, 107, 12; 73/151, 152; 340/854.7, 853.1, 854.9, 855.2

[56] References Cited

U.S. PATENT DOCUMENTS

| | | | |
|---|---|---|---|
| 4,579,420 | 4/1986 | Winter et al. | 385/113 |
| 4,632,506 | 12/1986 | Taylor | 385/101 |
| 4,723,832 | 2/1988 | Okazato et al. | 385/102 |
| 5,140,319 | 8/1992 | Riordan | 340/854.9 |
| 5,150,443 | 9/1992 | Wijnberg | 385/107 |
| 5,202,944 | 4/1993 | Riordan | 385/101 |
| 5,275,038 | 1/1994 | Sizer et al. | 73/151 |
| 5,355,128 | 10/1994 | Riordan | 340/854.7 |

*Primary Examiner*—Brian Healy
*Attorney, Agent, or Firm*—Fulwider Patton Lee & Utecht

[57] ABSTRACT

The down-hole instrument cable includes a hermetically sealed optical fiber surrounded by a protective buffer layer and a protective gel within a protective tube. A layer of electrical conductors between an inner insulator and outer insulator layer surrounds the protective tube, and electrically conductive strength member strands surround the outer insulator layer. The cable includes an electrically conductive cable head body electrically connected to the strength member strands, and an electrically conductive contact subassembly, through which the optical fiber and electrical conductors extend. The contact subassembly provides a first electrical terminal for connection to the down-hole instrument, the layer of electrical conductors provides a second electrical terminal, and the optical fiber provides an optical signal pathway for the down-hole instrument.

19 Claims, 8 Drawing Sheets

5,493,626

REDUCED DIAMETER DOWN-HOLE INSTRUMENT ELECTRICAL/OPTICAL FIBER CABLE

This application is a continuation, of application Ser. No. 08/239,948 filed May 9, 1994, now abandoned which is a continuation of application Ser. No. 08/086,392 filed May 21, 1993 now abandoned.

BACKGROUND

The invention relates generally to instrument cables for use in elongated passages, and more particularly concerns a reduced diameter cable for use in high pressure environments.

There has long been a need to visually examine downhole conditions of a well for various reasons. One of the more common uses of down-hole video is leak detection. The camera system may detect turbulence created by a leak and may identify different fluids leaking into the well bore. Particulate matter flowing out through a hole can be detected. Damaged, parted, or collapsed tubings and casings may also be detected. The severity of scale buildup in downhole tubulars, flow control devices, perforations and locking recesses in landing nipples can be seen and analyzed.

Additional uses for video camera systems include the detection of formation fractures and their orientations. Video logging provides visual images of the size and extent of such fractures. Down-hole video is also useful in identifying down-hole fish and can shorten the fishing job. Plugged perforations can be detected as well as the flow through those perforations while the well is flowing or while liquids or gases are injected through the perforations. Corrosion surveys can be performed with down-hole video and real-time viewing with video images can identify causes for loss of production, such as sand bridges, fluid invasion, or malfunctioning down-hole flow controls.

Down-hole instrument probes can be made extremely small due to the existence of charge-coupled device imaging systems and other technologies which can function as a camera in the down-hole instrument. Electrical circuitry inside such an instrument can also be made small with the use of semi-conductor devices. The instrument probe containing the remote video camera system and other electrical equipment is connected to the surface equipment by an umbilical instrument cable thereby permitting transmission of electrical power to the video camera and communication of data from the video camera to the surface equipment.

Many wells are relatively small in diameter, on the order of 4.5 cm (1.75 in). Consequently the instrument probe and its cable designated for use in such a well are limited in their respective diameters. This can lead to practical problems when a high pressure well is involved. Such wells are capped to prevent the uncontrolled escape of high pressure well fluids and, in order to insert a down-hole video instrument in such a well, the instrument must be forced into the well through the cap. As is well known in the art, smaller instruments are easier to insert into a high pressure environment because they present less surface area against which the high pressure well fluids can act. Those high pressure well fluids oppose entry of the cable into the well and the cable must be made heavy enough to overcome that fluid pressure force. Also, it has been found that small differences in the diameters of down-hole instrument cables can have a tremendous impact on the ease and expense in inserting that cable and an attached instrument into the well.

Referring now to the graph of FIG. 1, it can be seen that at a well pressure of 281 kg/cm$^2$ (4000 psi), a cable with a 1.11 cm (7/16 in (0.438)) diameter will require the addition of 295 kg (650 lbs) additional weight to overcome the force against it created by the well fluid pressure to enter the well. One common technique for adding that weight is to attach sinker bars to the cable. The diameter of the well limits the diameter of the sinker bars requiring a longitudinal distribution of the weight along the cable. In a 4.5 cm (1.75 in) diameter well, sinker bars having the standard outside diameter of 3.5 cm (1.375 in) would be used. Even if using the high density tungsten weights, each bar would be 1.8 meters (6 ft) long and has a weight of only 20.4 kg (45 lbs). This would result in the need for 15 sinker bars placed end to end on the cable and at 1.8 m (6 ft) each, a total length of 27.4 m (90 ft) of sinker bars results. Adding this length to the length of the instrument itself, which may be 4.5 m (15 ft), a total length of 31.9 m (105 ft) exists for the complete assembly. As shown in FIG. 2, the cable 16 must be raised above the well head 2, inserted through a pressure gland 4, through lubricator risers 6, and past the main valve 8. In this case with such a long length of weights, an extended crane would be required to lift the assembly of instrument, cable, and sinker bars over the main valve 8 of the well head 2 and the specially attached lubricator risers 6 attached to the well head as shown in FIG. 2 to accommodate the assembly. It has been found in some cases that the expense involved in supporting such a long length of lubricator risers 6, the need for high crane heights, and the amount of time involved in assembling and disassembling outweigh the advantage that would be provided by down-hole video.

A further review of FIG. 1 shows that for a cable having a diameter of 0.55 cm (7/32 in (0.218)) (approximately half of the previous cable diameter) and in a well having the same pressure of 281 kg/cm$^2$ (4000 psi), the weight required to overcome the fluid pressure and insert the cable into the well is only 77 kg (170 pounds), which is approximately one-fourth of the weight required for a cable twice its size. Using the same tungsten weight bars as described above, only four are required and at 1.8 m (6 ft) each, the total length of the lubricating risers needed to accommodate the weights and the instrument is 12 meters (39 ft). This is much more practical and much less expensive than the length required in the previous example. As is apparent from FIG. 1, even small changes in cable diameter result in much larger changes in weight requirements. Hence those concerned with high pressure wells have recognized the substantial effect that cable diameter has and have recognized the need for a reduced diameter cable so that insertion into high pressure wells is facilitated and made less expensive.

Another consideration in cable design is the impact of the cable length on the size of the internal cable components. In the case of a coaxial cable, the longer the cable, the larger the cable diameter must be to support needed data transmission parameters for real-time video. Thus, it has been found that for a coaxial cable length of 4,572 m (15,000 ft), a cable diameter of 1.3 cm (0.52 in) is needed to obtain the data rates desired for real time video. As shown above, this diameter cable results in an impractical length of weights for higher well pressures. However, it has been found that optical fibers are not as sensitive to long distances and have large bandwidths capable of supporting real-time video imaging. The use of fiber optics enables use of a much smaller diameter cable.

It is also important for a down-hole instrument cable to include electrical conductors for the conduction of electrical energy such as power. Electrical conductors also take up space in a cable and therefore it has been recognized that the electrical conductors should also be kept to as small a size as possible. However, certain electrical performance requirements must still be met. Additionally, the conditions within a well to which the instrument cable is exposed can be quite harsh, with hydrostatic well pressures in excess of 421 kg/cm$^2$ (6,000 psi) and ambient wall temperatures reaching 110° C. (230° F.) and higher. Wells may contain certain caustic fluids such as hydrogen sulfide which can cause optical fiber deterioration and poor performance. The fiber must be protected from leakage of such fluids. Wells often also have joints with protruding collars against which the cable can rub while the cable is inserted and withdrawn from the well. Sharp objects in the well can also damage the cable, and can break through and severely damage a fluid seal provided by an outer sheath of plastic on cable so equipped. Therefore, it has been recognized by those skilled in the art that a fluid tight seal is needed about the optical fiber or fibers in the cable as well as a rugged outer cable surface.

In many cases, the well can also be quite deep, and the length of the down-hole instrument cable can exceed 4,572 to 4,877 meters (15,000 to 16,000 ft). Longitudinal stresses placed on an optical fiber in such a long cable can sever or fracture the optical fiber, causing significant signal attenuation. Hence, the cable must be designed not only to resist physical damage to its outer surface from use in the well, and provide a robust fluid seal to protect the optical fiber and electrical conductors, but also to support the weight of the down-hole instrument and the cable itself.

Down-hole optical fiber instruments include terminations for receiving the optical fiber, electrical conductors, and strength members. Such connections should be implemented in a way such that the internal components of the instrument probe are isolated from the high pressures and temperatures within the well bore.

Hence those skilled in the art of down-hole instrument cables and terminations have recognized the need for a reduced diameter cable for use in high pressure wells and terminations made in a way which does not subject the instrument to the high pressure fluids of the well. The present invention satisfies these needs and others.

SUMMARY OF THE INVENTION

Briefly, and in general terms, the present invention provides for a communications cable for a down-hole instrument probe, the cable being designed to operate in a down-hole environment to conduct electricity and communicate optical signal data between the instrument probe and a surface station.

In accordance with one aspect of the invention, a down-hole instrument cable includes an hermetically coated optical fiber surrounded by a protective buffer layer, and an inert gel layer within a protective tube. The protective tube is covered by an inner insulator, a braided layer of electrical conductors, and an outer insulator/fluid seal, which is in turn surrounded by a plurality of electrically conductive strength member strands forming part of the electrical loop.

In another aspect of the invention, the cable includes a cable termination assembly including an electrically conductive cable head body electrically connected to the strength member strands, which terminate at the cable head body. The electrical conductors of the cable extend through an electrically conductive contact subassembly electrically connected to the cable head body. The contact subassembly provides an electrical terminal for connection to the down-hole instrument, while the layer of electrical conductors provide a second electrical terminal for connection to the down-hole instrument, and the optical fiber extends through the contact subassembly for connection to the down-hole instrument.

These and other aspects and advantages of the invention will become apparent from the following detailed description, and the accompanying drawing, which illustrates by way of example the features of the invention.

DETAILED DESCRIPTION OF A PREFERRED EMBODIMENT

Visual examination of the tubulars, casings, and fittings of a well and the contents of a well typically requires specially designed well-logging systems that can withstand the harsh conditions within such wells. Such well-logging systems for examining wells are described in U.S. Pat. Nos. 5,140,319 and 5,202,944, which are incorporated herein by reference. As discussed above, such wells can often be a mile or more deep, and can subject a viewing instrument to high temperatures and pressures.

Figure 1:
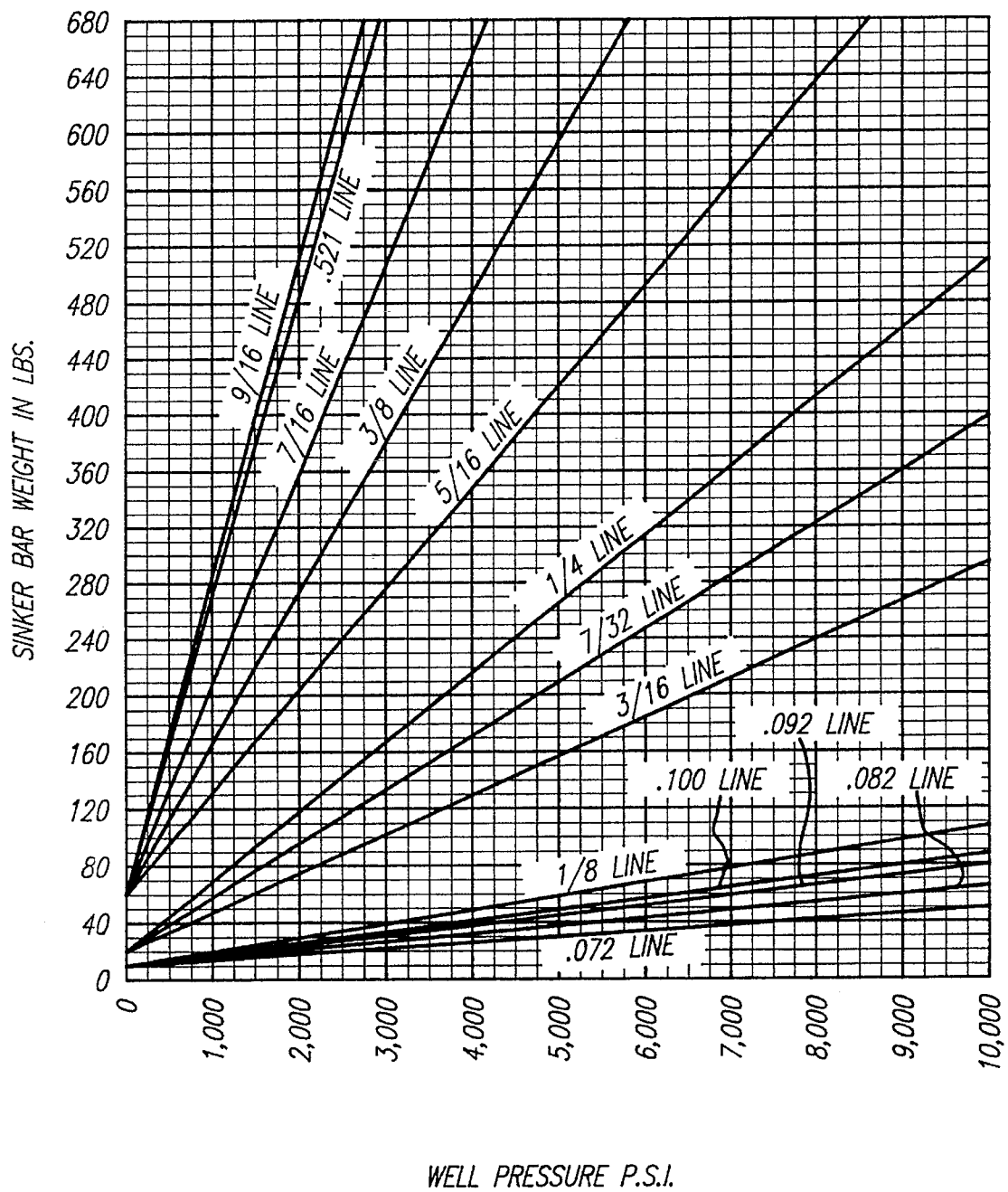
FIG. 1 a graph showing sinker bar weight versus well pressure.
Figure 2:
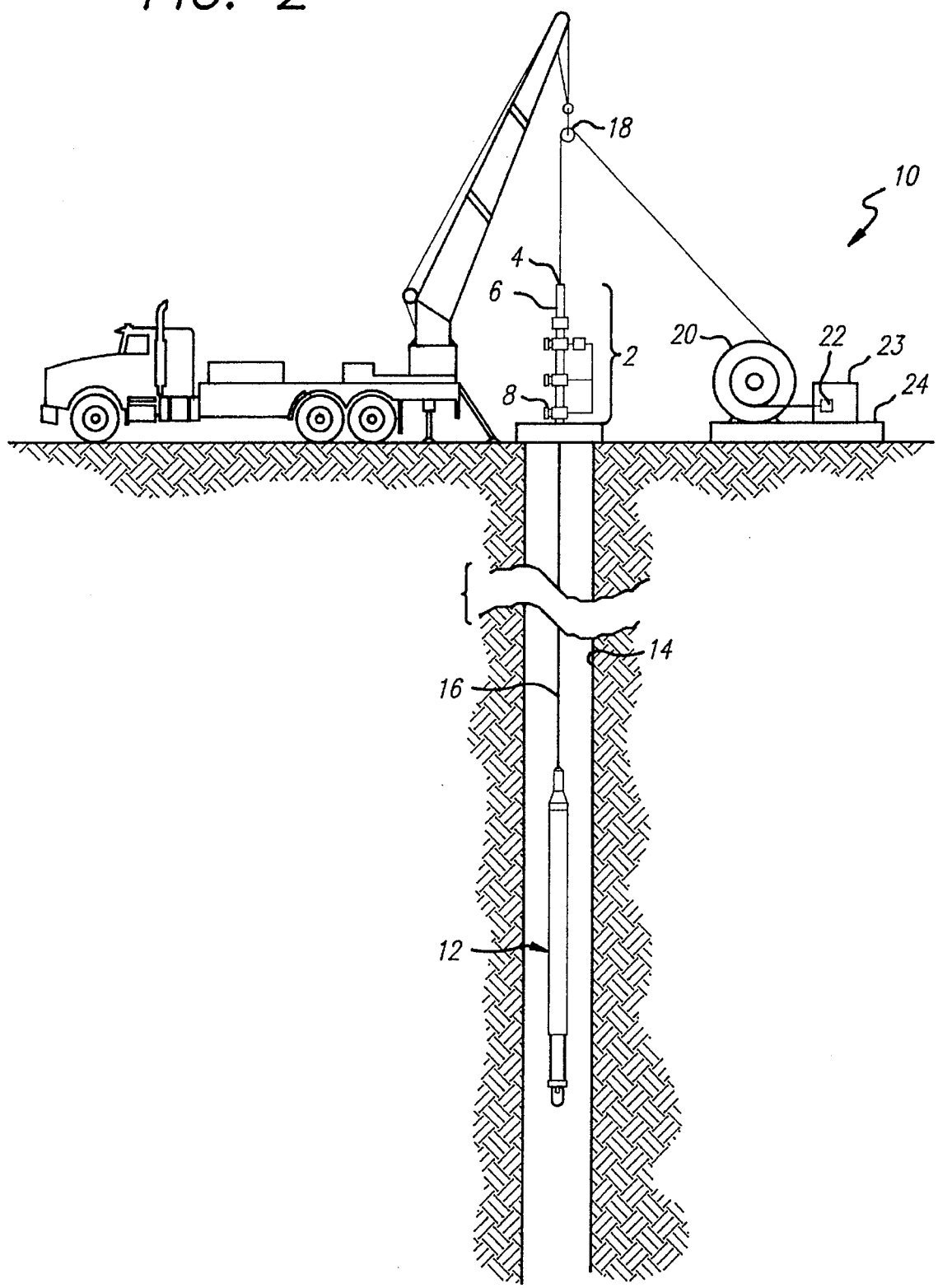
FIG. 2 is an over all block diagram of a well logging system with which the instrument cable of the invention can be used.

As is illustrated in the drawings, the down-hole instrument cable of the invention is intended for use in a well logging system 10 for examining the interior of a well, as is shown in FIG. 2. The well logging system includes a well instrument probe 12 to be lowered into a well 14, suspended from a down-hole instrument support cable 16. The cable is retained in a sheave 18 and a rotatable winch 20 for raising and lowering the support cable and instrument probe. A surface controller 22 is provided in enclosure 23 on a transportable platform 24 which is typically a skid unit, for controlling the operation of the winch. The surface controller also receives and processes information communicated by the cable from the instrument probe. The enclosure may also contain a recorder, such as a video tape recorder, for recording the information provided by the instrument probe.

Figure 3:
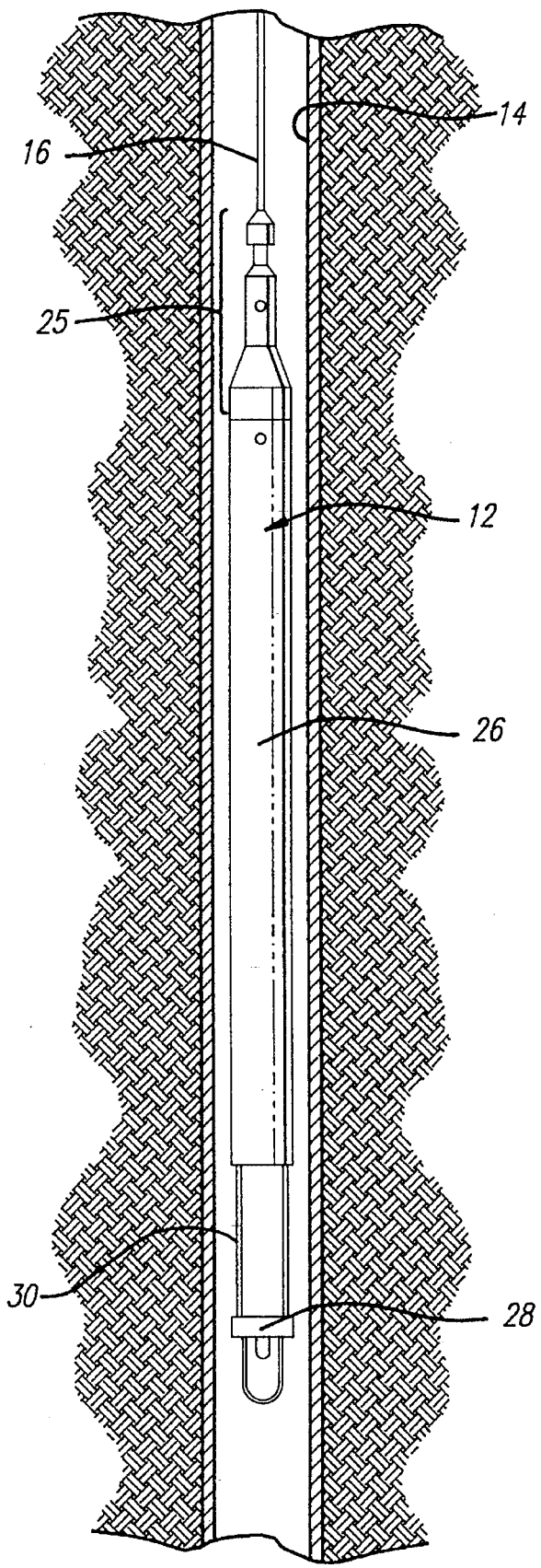
FIG. 3 is a side view of an instrument probe in place in a well bore showing the camera section and light section with which the instrument cable of the invention can be used.
Figure 4:
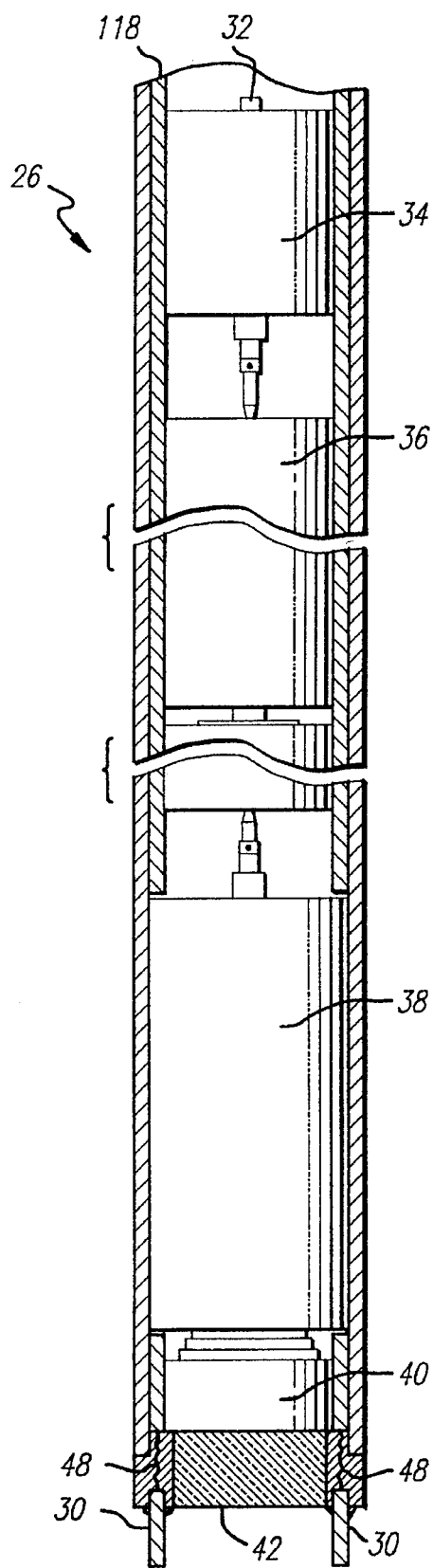
FIG. 4 is a, partial cross-sectional side view of part of the camera section of the instrument probe showing the camera, lens and window or port cover, and mount for the light section with which the instrument cable of the invention can be used.
Figure 5:
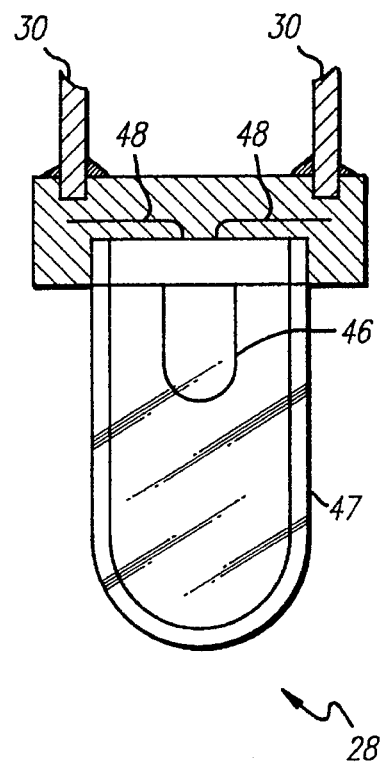
FIG. 5 is a partial cross-sectional view of the light section of the instrument with which the instrument cable of the invention can be used.

The instrument probe generally includes three sections: a cable head 25 connected to the support cable, a camera head 26, and a light head 28, as is illustrated in greater detail in FIGS. 3, 4, and 5. The light head is attached to the camera head by three legs 30, two of which are shown. The distal end section 32 of the support cable is coupled to an optical transmitter or converter 34, where electrical signals representing images from the camera are converted into optical signals. Such electrical/optical converters and couplers for coupling the converter to the optical fiber are well known in the art. The optical signals are typically transmitted from the optical converter through an optical fiber 50 in the support cable 16 to the surface.

The electricity carried by the cable can be converted in the electrical section 36 into the voltages required by the camera 38, the light head 28, and the electrical/optical converter 34. For example, the voltage supplied by the cable may be 100 Vdc, while the camera operates on 12 Vdc, and the light head on 50 Vdc. Such converter boards are well known in the art, such as Model SWA 175-4300 by Power-One, Inc., Camarillo, Calif. In one embodiment, power is transmitted from the controller at the surface to the support cable via slip rings at the winch drum, in accordance with techniques known to those skilled in the art.

In one currently preferred embodiment, the camera is a charge coupled device (CCD) type television camera that is capable of providing high speed, high resolution images in relatively dim light. One suitable camera is the CCD Video Camera Module, model number XC 37 made by Sony Corporation. The camera system includes a lens 40, which can for example be a fisheye lens, and an outer protective or port window 42, which seals and protects the camera 38 from high temperature and high pressure fluids that can exist in a well. As can best be seen in FIG. 5, the light head 28 preferably includes a lamp, such as halogen lamp 46, a dome 47 covering the lamp 46, and electrical conductors 48 routed through the support legs 30 of the light head mounted to the camera head.

Figure 6:
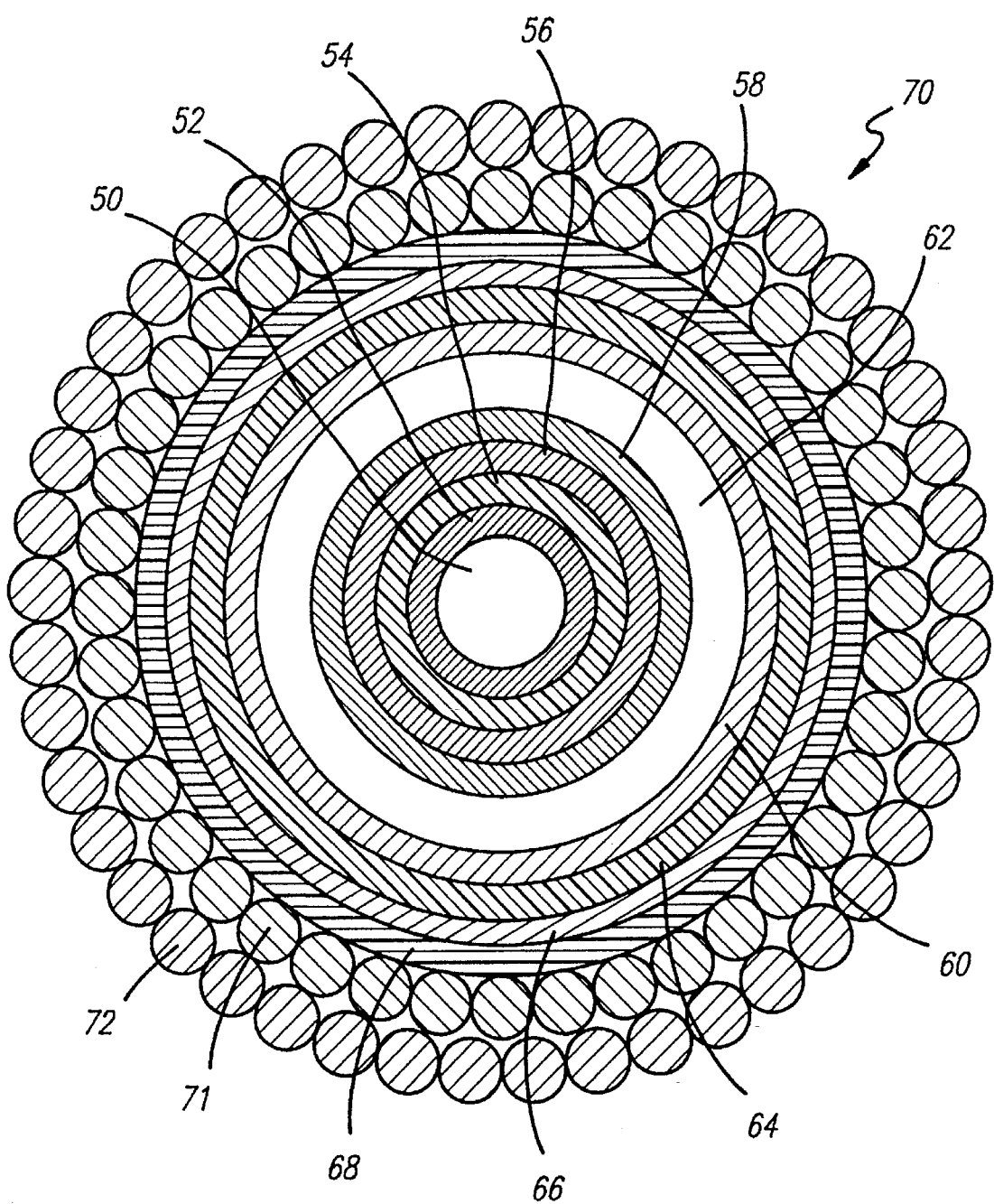
FIG. 6 is a cross-sectional view of an embodiment of an instrument cable in accordance with the invention.

With reference to FIG. 6, a down-hole instrument cable in accordance with the invention includes an optical fiber 50 which is centrally located in the cable for carrying optical signals over long distances, and which is capable of operating at elevated temperatures. Although a single optical fiber is illustrated, multiple optical fibers may be used to provide a fiber optic cable. The optical fiber is preferably hermetically sealed in a layer of inorganic material 52, such as carbon, to protect the optical fiber from the deleterious effects of hydrogen and other gases, which can cause attenuation of the optical signal, particularly at elevated temperatures and pressures. The coating of inorganic material is typically a very thin layer less than 500 Å applied to the optical fiber over the outer cladding layer of the optical fiber, and is preferably covered with a polymer coating 54, which can be a thermosetting acrylate coating resin such as 2-hydroxyethyl acrylate or hydroxypropyl acrylate. In one preferred embodiment, the optical fiber is a 50/125 CPC3 multi-mode optical fiber available from Corning. The diameter of the core of the optical fiber is about 0.050 mm (0.002 in); the outer diameter of the cladding is about 0.125 mm (0.005 in), and the outer diameter of the polymer coating is about 0.250 mm (0.10 in). In order to further protect the optical fiber from damage which can occur due to rubbing, the hermetically coated optical fiber is also preferably coated with a layer of silicone 56, which is in turn covered in a layer of tetrafluoroethylene (TFE) fluorocarbon polymer 58, to provide a surface coating with a low coefficient of friction.

The hermetically coated optical fiber, together with the coatings of silicone and TFE, are disposed in a protective sheath 60, which in one preferred embodiment is a stainless steel tube laser welded longitudinally, having a wall thickness of about 0.200 mm (0.008 in), so that it is thin enough to be relatively flexible. The protective sheath additionally provides a fluid seal. The stainless steel is preferably formed from a strip of stainless steel, which is folded in the shape of a tube. As the tube is folded, the coated optical fiber is inserted in the tube. The stainless steel protective sheath is advantageous because it can be laser welded, which results in less heat being applied to its contents during assembly. Olen tubes formed from copper or brass and soldered have been used in conventional techniques, but it has been found over the years that when a soldered copper or brass tube has an extended length, the solder joint tends to split open. An inert gel layer 62 is also preferably injected into the protective sheath around the coated optical fiber as the sheath is folded into the shape of a tube and laser welded. The inert gel layer functions to reduce shock, friction and abrasion that the optical fiber would otherwise experience due to the rolling and unrolling of the cable on the winch drum, and other twisting and bending motions which the cable undergoes during use. The inert gel also helps to support the weight of the optical fiber within the protective sheath, to prevent the optical fiber from rupturing itself due to its own weight when the support cable is suspended in a well bore. One inert gel typically used is a thixotropic buffer tube compound having a viscosity of about 280 ±15, (Penetrometer, ASTM D-217) and smooth, buttery consistency, and is available under the trade name "SYNCOFOX" from Synco Chemical Corporation.

Surrounding the protective sheath is an inner insulator jacket 64, preferably made of a high temperature resistant material which is an electrical insulator, having a relatively high melting point exceeding 148° C. (298° F.), such as polypropylene which has a melting point at about 168°–171° C. (333°–340° F.). Other materials which also may be suitable for use as an insulator jacket are high temperature resistant fluorocarbon polymers such as TFE, and ethylene-tetrafluoroethylene copolymer (ETFE), sold under the trade name "TEFZEL" by E. I. du Pont. The inner insulator jacket typically has a thickness of about 0.254 mm (0.010 in), and an outer diameter of about 1.68 mm (0.066 in). This layer provides a surface on which to form the copper braid layer.

Formed on and surrounding the inner insulator jacket 64 is an inner layer of electrically conductive strands 66, which in one embodiment is a single layer of a braid of bare copper wire strands, which is braided onto the polypropylene inner insulator jacket 64 as the jacket is extruded over the stainless steel protective sheath 60. It has been found that the use of braided copper as the electrical conductor layer results in an increase in the density of copper in that layer over prior techniques which use a helical "serve" of copper. Thus, an increase in electrical conductive capacity results with this relatively thin copper layer. In prior techniques using a serve, the layer size would be larger to obtain the same conductive capacity provided by the braided approach shown here. These copper strands can conduct electricity between the controller 22 and the instrument probe, light head, and optical converter components.

In another embodiment, the inner insulator jacket 64 may not be included and the braid of copper 66 may be formed directly on the protective sheath 60.

An outer insulator jacket 68, also preferably formed of a material having a relatively high melting point, and in this embodiment is also polypropylene, but which may also be formed of the other materials mentioned above in relation to the inner jacket 64, surrounds the inner layer of electrically conductive strands, and typically has a wall thickness of about 0.56 mm (0.022 in) and an outer diameter of about 3.30 mm (0.13 in). This layer is preferably formed in two extrusions. In the first extrusion, the polypropylene flows into the copper braid resulting in a stabilizing jacket. The second extrusion provides the thickness of the layer 68 required for fluid seal purposes. The outer jacket 68 also forms an electrical insulator between the strength members 70 which are used for conducting electricity and the copper braid layer 66.

A plurality of strength member strands 70 preferably surround the outer insulator jacket 68, and in one preferred embodiment comprise an inner layer 71 of strength member strands wound helically around the outer insulator jacket in one direction, and an outer layer 72 of stainless steel armor strength member strands wound helically around the inner layer of strength member strands in an opposite serve or winding. The opposite serves of strength member strands help prevent the cable from becoming twisted. In one embodiment, the strength member strands were formed of galvanized improved plow steel. Other embodiments may use stainless steel as the strands or an alloy known as MP 35 for particularly corrosive environments, such as where hydrogen sulfide is present.

With the two layers of strength member strands, an exemplary total diameter of the cable 16 is approximately 5.72 mm (0.225 in), and with minor variations in the thickness of the various layers of the cable, the total diameter can typically range from about 4.76 mm (3/16 in) to about 7.94 mm (5/16 in). The plurality of strength member strands are electrically conductive, and can provide a leg of an electrical power supply loop.

Figure 7:
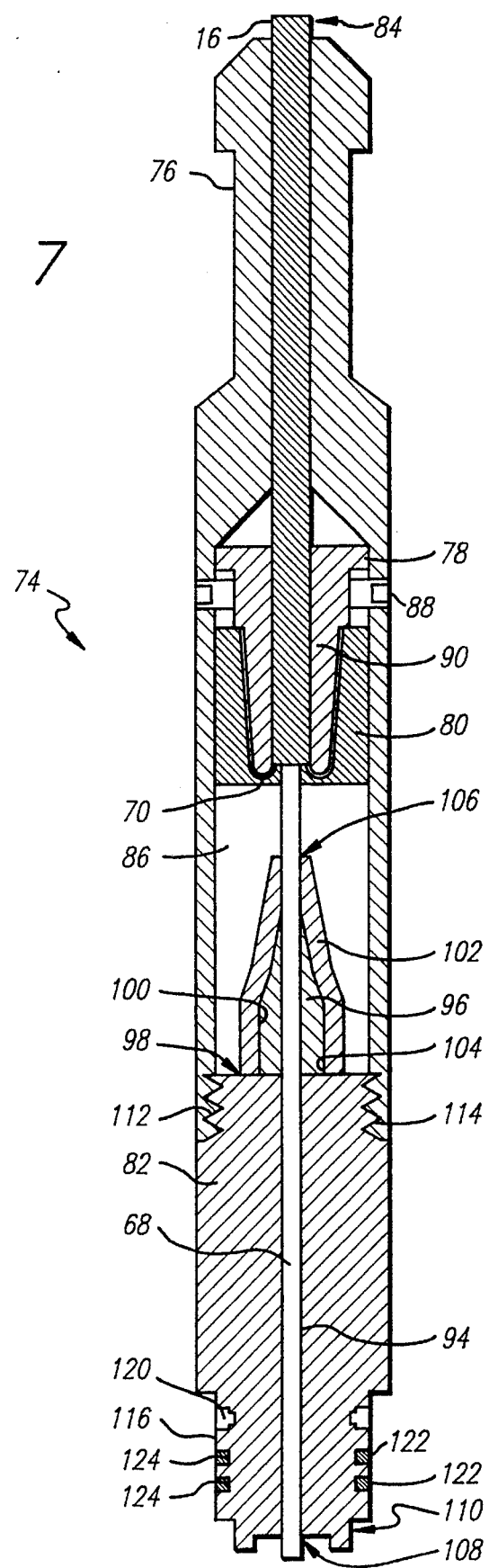
FIG. 7 is a partial cross-sectional view of an embodiment of a cable termination assembly of the instrument cable in accordance with the invention.
Figure 8:
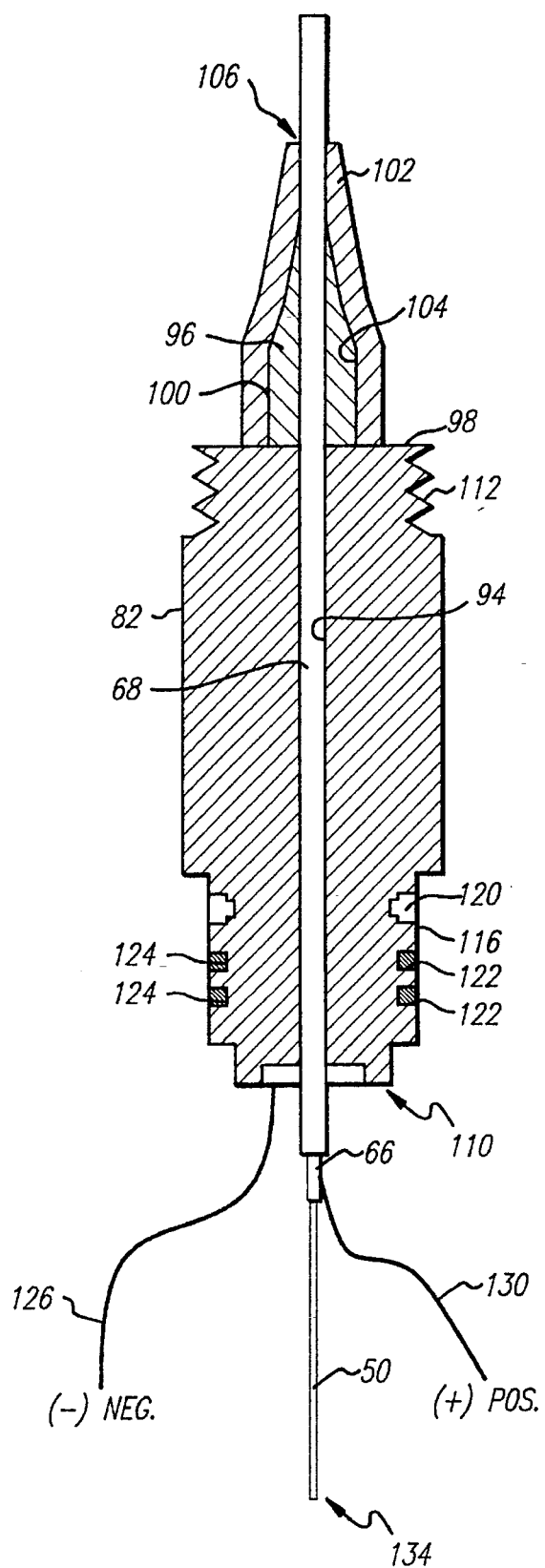
FIG. 8 is a partial cross-sectional view of the contact subassembly of FIG. 7, showing one preferred sealing arrangement.
Figure 9:
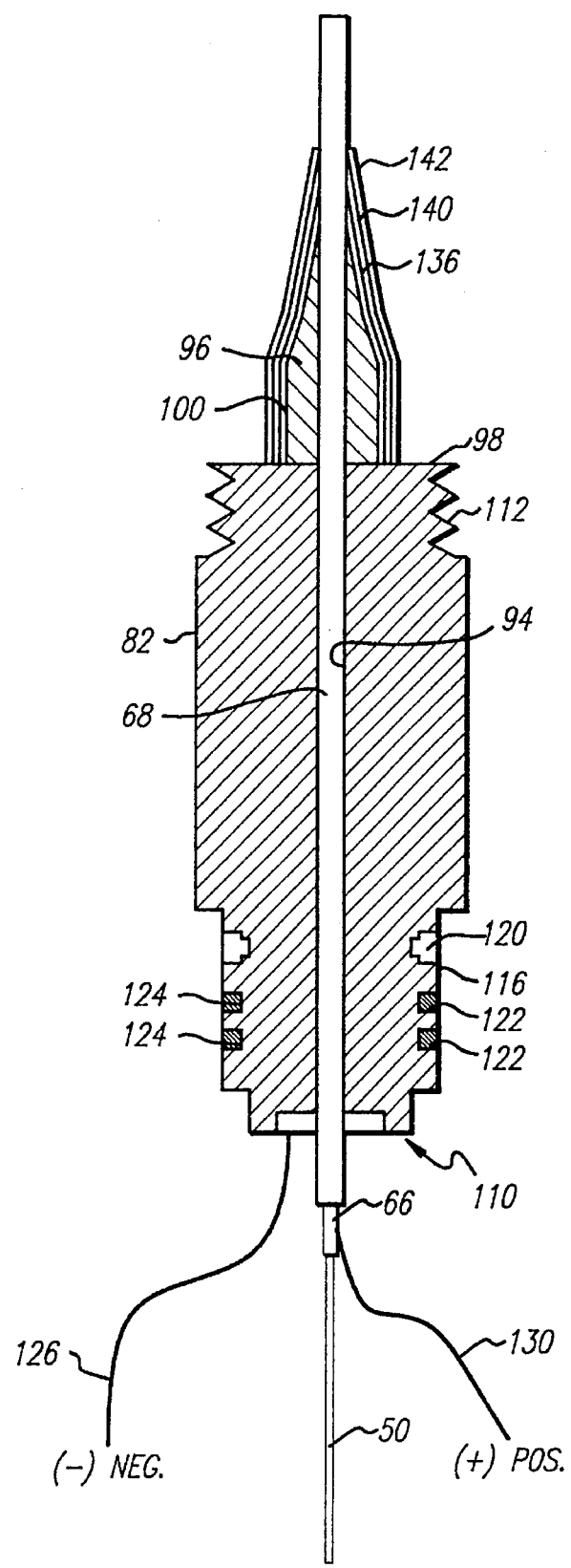
FIG. 9 is a partial cross-sectional view of the contact subassembly similar to that of FIG. 8, showing an alternate sealing arrangement.

The support cable 16 includes a cable termination assembly 74, as is illustrated in FIGS. 7, 8 and 9. The cable termination assembly generally includes an electrical conductive cable head body 76 coaxially disposed about the distal end of the support cable 16, an electrically conductive rope socket body 78 disposed within and secured to the cable head body 76 and coaxially disposed about the support cable, an electrically conductive clamp ring 80 disposed within the cable head body and secured over the rope socket body, and an electrically conductive contact sub-assembly 82 secured to a distal end of the cable head body. Down-hole well fluids typically can enter the cable head body through the proximal end of the lumen 84 extending axially through the cable head body over the outer armor strength member strands of the cable, particularly at high pressures, permitting well fluids to enter the interior chamber 86 of the cable head body. The rope socket body is typically secured to the cable head body by set screws 88 in cable head body.

The plurality of strength member strands are terminated a short distance distally of the rope socket body, are folded back over the conical flange 90 of the rope socket body, and are matingly locked in place over the conical flange by the clamp ring 80, completing an electrical connection of the strength member strands to the cable head body. The number of the strength member strands folded back determine the break-away force required for the cable to be separated from the instrument probe. By judiciously selecting the number of the folded back strength member strands, the force may be set so that if the instrument probe becomes stuck in a well, the cable can be pulled free of the instrument probe, and the probe can be recovered separately. Strength members not folded back are cut off. The outer insulator jacket 68 is not terminated at this point, and the rest of the cable, including the outer insulator jacket, electrical conductors, inner insulator jacket, protective sheath and buffer layers, and the optical fiber of the cable continue on through the inner chamber 86 of the cable head body to extend through an axial lumen 94 of the contact subassembly 82. The portion of the cable remaining after the point where the strength members are folded back enters the contact subassembly through a generally conical sealing nipple 96 at the proximal end 98 of the contact subassembly.

The sealing nipple 96 of the contact subassembly includes an exterior annular recessed portion 100, for snap-fit mating with a generally conical, flexible sealing boot 102, having an internal rib 104 corresponding to the recess 100 of the sealing nipple. The boot includes a narrow aperture 106, which fits tightly over the outer insulator jacket of the cable, and is further compressed over the cable and sealing nipple to form a seal between the contact subassembly and the well fluids by the high pressure of the well fluids. The cable exits through an aperture 108 of the contact sub-assembly at the distal end 110 of the contact subassembly. The contact subassembly is connected to the distal end of the cable head body by external proximal threads 112 which are matingly secured to corresponding internal threads 114 of the distal portion of the cable head body. The distal portion of the contact subassembly includes a shoulder 116 for receiving the chassis 118 of the converter assembly 34, and includes sockets 120 for set screws for securing the chassis of the converter assembly to the contact subassembly. O-ring seals 122 are provided in sockets 124 for further sealing of the distal end of the contact subassembly and the chassis of the converter assembly from well fluid pressure. As is shown in FIGS. 8 and 9, an electrical connector 126 is electrically connected to the contact subassembly, completing the electrical connection through the contact subassembly and strength member strands, to provide a first electrical terminal for the camera head, light head, and electro/optical converter. The outer insulator jacket 68 typically terminates a short distance distally of the contact subassembly, exposing the inner layer of electrically conductive strands, to which an electrical connector 130 is electrically connected, such as by welding, soldering, bolts or screws, or the like, to provide a second electrical terminal. The distal end 134 of the optical fiber is located distally of the contact subassembly for connection to the electro/optical converter, for communicating signal data from the camera to the surface equipment.

Although the well fluid seal at the sealing nipple of the contact subassembly has been described as a flexible boot, in another currently preferred embodiment, the sealing nipple can be sealed by an appropriate sealing material, which can for example comprise a first layer of adhesive backed TFE tape 136, typically about 12.7 mm (0.5 in) wide, a second layer of splicing tape 140, such as 23#rubber splicing tape available from 3M, and a third layer of all-weather tape 142 such as Super 88 all-weather vinyl tape available from 3M. The well fluid pressure has been found to compress the multiple tape layers to also effectively seal the contact assembly from the well fluids.

Thus by the use of either the sealing boot or tape seal layers, the electrical and optical connections of the support cable to the instrument probe are made fluid tight for use in high pressure well fluid environments. Additionally, because the seal is made of standard components, the seal is economical to provide and manufacturing on a repeatable basis is facilitated. The layers of mechanical, thermal and electrical insulation in the cable surrounding the optical fiber minimize attenuation of signal data carried by the optical fiber which can occur due to damage by hydrogen and other gases at elevated temperatures and pressures, and severing or fractures of the optical fiber due to mechanical stresses. In addition, by continuation of the optical fiber of the support cable through the contact subassembly directly to the optical converter assembly without termination prior to the contact subassembly, attenuation of the signal data communicated from the instrument probe is further minimized.

It should be recognized that the electrical conductors in the down-hole instrument cable of the invention which can be used for carrying electrical power from the surface for operation of the instrument probe or other devices can also be used to conduct electrical signals, especially when the instrument probe can be operated from battery power carried by the instrument probe itself. The size of the cable is minimized by the dual function of the strength member strands to protect the cable from physical damage and as part of an electrical path. By utilizing a single optical fiber in the cable configuration of the invention, a braided copper layer, and strength members which form a part of the electrical loop, the total diameter of the cable in one embodiment is only about 5.72 mm (0.225 in), which is very small, and insertion of the cable into a high pressure well is greatly facilitated and made less expensive.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A down-hole instrument cable having a reduced diameter, comprising:

an optical fiber;

a protective buffer layer surrounding said optical fiber;

a protective sheath surrounding said optical fiber and said protective buffer layer;

a first insulator surrounding said protective sheath, said first insulator being formed of a heat resistant, relatively high melting point material;

a layer of electrical conductors surrounding the first insulator;

a second insulator surrounding said layer of electrical conductors, said second insulator being formed of a heat resistant, relatively high melting point material; and a plurality of electrically conductive strength member strands surrounding said second insulator forming an outer surface of the cable.

2. The reduced diameter cable of claim 1, wherein said protective buffer layer includes a layer of silicone.

3. The reduced diameter cable of claim 2, wherein said protective buffer layer includes a layer of tetrafluoroethylene disposed over said layer of silicone.

4. The reduced diameter cable of claim 1, further including a layer of gel material disposed between said protective metallic tube and said buffer layer.

5. The reduced diameter cable of claim 1, wherein said protective sheath comprises a stainless steel tube.

6. The reduced diameter cable of claim 1, wherein said first and second insulators comprise polypropylene.

7. The reduced diameter cable of claim 1, further including a conductive cable head body electrically connected to said plurality of electrically conductive strength member strands, said plurality of electrically conductive strength member strands terminating at said conductive cable head body; and a conductive contact subassembly having proximal and distal ends, said contact subassembly being electrically connected to said cable head body, said contact subassembly providing a first electrical terminal for connection to a down-hole instrument, said contact subassembly including an aperture extending axially therethrough, a remaining portion of said cable including said optical fiber, protective buffer layer, protective tube, first and second insulators, and layer of electrical conductors extending through said aperture in said contact subassembly, said layer of electrical conductors providing a second electrical terminal for connection to said down-hole instrument, and said optical fiber providing an optical terminal for said down-hole instrument.

8. The reduced diameter cable of claim 7, wherein said contact subassembly includes a sealing member at the distal end of the contact subassembly, said aperture at the distal end of said contact subassembly and said remaining portion of said cable extending through said sealing member, and said aperture in said sealing member being sealed around said remaining portion of said cable by a flexible boot.

9. The reduced diameter cable of claim 7, wherein said contact subassembly includes a sealing member at the distal end of the contact subassembly, said aperture at the distal end of said contact subassembly and said remaining portion of said cable extending through said sealing member, and said aperture in said sealing member being sealed around said remaining portion of said cable by a plurality of layers of sealing tape.

10. The reduced diameter cable of claim 1, wherein said optical fiber comprises a single optical fiber located centrally within said cable.

11. The reduced diameter cable of claim 1 wherein the optical fiber is hermetically sealed.

12. A down-hole instrument cable system, the cable system comprising:

a reduced diameter cable comprising:
      a centrally located optical fiber;
      a protective buffer layer surrounding said optical fiber;
      a protective sheath surrounding said optical fiber and said protective buffer layer;
      a layer of electrical conductors surrounding the protective sheath;
      a plurality of electrically conductive strength member strands surrounding said layer of electrical conductors, wherein said plurality of electrically conductive strength member strands form an outer surface of the cable;
      a fluid barrier insulator disposed between said layer of electrical conductors and said plurality of electrically conductive strength member strands, said fluid barrier insulator being formed of a heat resistant, relatively high melting point material; and a conductive cable head body electrically connected to said plurality of electrically conductive strength member strands, said plurality of electrically conductive strength member strands terminating at said conductive cable head body; and a conductive contact body having proximal and distal ends, said contact body being electrically connected to said cable head body, said contact body providing a first electrical terminal for connection to a down-hole instrument, said contact body including an aperture extending axially therethrough, an unarmored portion of said cable including said optical fiber, protective buffer layer, protective tube, fluid barrier insulator, and layer of electrical conductors extending through said aperture in said contact body, said layer of electrical conductors providing a second electrical terminal for connection to said down-hole instrument, and said optical fiber providing an optical terminal for said down-hole instrument.

13. The system of claim 12, wherein said protective buffer layer includes a layer of silicone.

14. The system of claim 13, wherein said protective buffer layer includes a layer of tetrafluoroethylene.

15. The system of claim 12, further including a layer of gel material disposed between said protective sheath and said buffer layer.

16. The system of claim 12, wherein said protective sheath comprises a stainless steel tube.

17. The system of claim 12, wherein said fluid barrier insulator comprises a material having a relatively high melting point.

18. The system of claim 12, further including an insulator disposed between said protective sheath and said layer of electrical conductors.

19. The cable of claim 12, wherein said contact body includes a sealing member at the proximal portion of the contact body, said sealing member having an aperture extending axially therethrough, said unarmored portion of said cable extending through said aperture of said sealing member, and further including sealing means disposed over said aperture in said sealing member and said unarmored portion of said cable for sealing said distal portion of said contact body against well fluids.

* * * * *